(12) United States Patent  (10) Patent No.: US 8,956,778 B2
Zhang et al.  (45) Date of Patent: Feb. 17, 2015

(54) CATHODE FLOW SPLIT CONTROL AND PRESSURE CONTROL FOR A VEHICLE FUEL CELL POWER SYSTEM

(71) Applicant: GM Global Technology Operations LLC, Detroit, MI (US)

(72) Inventors: Yanyan Zhang, Victor, NY (US); Joseph Mussro, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 98 days.

(21) Appl. No.: 13/660,075

(22) Filed: Oct. 25, 2012

(65) Prior Publication Data

US 2014/0120446 A1 May 1, 2014

(51) Int. Cl.
*H01M 8/04* (2006.01)
(52) U.S. Cl.
USPC ............................................... 429/444

(58) Field of Classification Search
None
See application file for complete search history.

(56) References Cited

U.S. PATENT DOCUMENTS

| | | | |
|---|---|---|---|
| 6,815,106 B1* | 11/2004 | Salvador et al. | 429/427 |
| 2001/0024746 A1* | 9/2001 | Ueda et al. | 429/22 |
| 2005/0095474 A1* | 5/2005 | Rainville | 429/22 |
| 2009/0098426 A1* | 4/2009 | Tsuchiya et al. | 429/23 |
| 2009/0325010 A1* | 12/2009 | Kirklin | 429/22 |
| 2010/0239935 A1* | 9/2010 | Katano | 429/443 |

* cited by examiner

*Primary Examiner* — Patrick Ryan
*Assistant Examiner* — Jose Colucci Rios
(74) *Attorney, Agent, or Firm* — Dinsmore & Shohl LLP (57) ABSTRACT

Devices and methods to control a cathode backpressure valve and a bypass valve in a vehicle fuel cell system. A feedforward-based control strategy is used to control the cathode backpressure valve. The control over the bypass valve is integrated into the control over the cathode backpressure valve. Such a control strategy acts in a predictive manner to improve valve response to transitory cathode pressure and bypass flow split setpoints in the system.

20 Claims, 4 Drawing Sheets

CATHODE FLOW SPLIT CONTROL AND PRESSURE CONTROL FOR A VEHICLE FUEL CELL POWER SYSTEM

BACKGROUND OF THE INVENTION

The present invention relates generally to controlling a reactant gas in a vehicle fuel cell system, and more particularly to devices and methods for controlling the gas by regulating a backpressure valve and a bypass valve connected to a fuel cell stack.

Fuel cells convert a fuel into usable electricity via chemical reaction. A significant benefit to such an energy-producing means is that it is achieved without reliance upon combustion as an intermediate step. As such, fuel cells have several environmental advantages over internal combustion engines (ICEs) and related power-generating sources. In a typical fuel cell—such as a proton exchange membrane or polymer electrolyte membrane (in either event, PEM) fuel cell—a pair of catalyzed electrodes are separated by an ion-transmissive medium (such as Nafion™). The chemical reaction occurs when a gaseous reducing agent (such as hydrogen, $H_2$) is introduced to and ionized at the anode and then made to pass through the ion-transmissive medium such that it combines with an ionized form of a gaseous oxidizing agent (such as oxygen, $O_2$) that has been introduced through the other electrode (the cathode); this combination of ionized reactants (along with electrons that have passed through the load) form water as a byproduct. The electrons that were liberated in the ionization of the hydrogen proceed in the form of direct current (DC) to the cathode via external circuit that typically includes a load where useful work may be performed. The power generation produced by this flow of DC electricity can be increased by combining numerous such cells to form a fuel cell stack.

To improve the delivery of the reactant gases, pressurized sources are often used. For example, the air being delivered to the cathode side of a fuel cell system is often by way of a compressor, where ancillary equipment—such as valves, controllers or the like—is used to regulate the airflow between the compressor and fuel cell. An inherent attribute of a compressor-aided delivery system (at least as it relates to cathode-side operation) is that the cathode's pressure and flow control are coupled together; this coupling means that stable operation can often be best achieved through a feedforward-based control strategy to take advantage of known or ascertainable mathematical relationships. In this way, a command signal based on known operational characteristics of the compressor may be sent to the compressor to affect a change therein in a way that will ensure predictable, repeatable response.

Nevertheless, it remains challenging and difficult to develop new control systems to precisely regulate the flow of such reactants used in a fuel cell system. This is particularly acute in vehicular-based fuel cell systems where reliability, weight and cost further compound the challenges.

SUMMARY OF THE PRESENT INVENTION

In one embodiment, a vehicular fuel cell system is disclosed. The system includes a fuel cell stack, a backpressure valve and a bypass valve, and the system is configured to improve the response time of the backpressure valve through a feedforward-based control strategy. An inlet of the backpressure valve is connected to an outlet of the fuel cell stack. An inlet of the bypass valve is connected to an inlet of the fuel cell stack, while an outlet of the bypass valve is connected to an outlet of the backpressure valve. The system also includes a controller comprising one or more processors and a non-transitory memory in communication with the one or more processors. The memory stores instructions that, when executed by the one or more processors, cause the one or more processors to utilize the feedforward-based control strategy based on an understanding of the impact of backpressure valve and bypass valve manipulation on fuel cell stack operation. In one embodiment, the instructions stored in memory are in form of a mathematical model to control gas pressure in the fuel cell stack by regulating the position of the backpressure valve and the bypass valve; such mathematical model may be stored in the form of formulae where insertion of input parameters produces an operation-related response. Likewise, such instructions may correlate inputs and outputs via lookup table or related device, where such device may have values based on known performance characteristics for a particular component (such as those derived from a compressor map for a particular compressor). The feedforward-based control strategy utilizes a stack pressure setpoint, a stack pressure feedback value and a feedforward backpressure valve value corresponding to a position of the backpressure valve. The instructions also cause the one or more processors to utilize one or more pressure drop models that in turn feed into a valve position model that itself is used as input for the feedforward backpressure valve value. The instructions further cause the one or more processors to utilize the stack pressure feedback value, one or more pressure drop models for the bypass valve, and the valve position model for the bypass valve to regulate the position of the bypass valve to control the flow split between the stack and the bypass valve, as well as to (if needed) bypass extra flow not required by the stack. In this way, the backpressure valve is controlled to satisfy the pressure setpoint of the fuel cell stack, while the bypass valve is controlled to satisfy the flow setpoint of the fuel cell stack. As will be discussed in more detail below, the feedforward-based strategy for the backpressure control valve may be used in conjunction with (or as part of) a feedback-based strategy for both the backpressure valve and the bypass valve as a way to control the stack pressure and flow in order to meet setpoints in situations where the bypass valve is open.

In another embodiment, a controller for a vehicle fuel cell system is disclosed. The controller includes one or more processors and a non-transitory memory in communication with the one or more processors. The memory stores instructions that, when executed by the one or more processors, cause the one or more processors to utilize a feedforward-based control strategy to control gas pressure in a fuel cell stack by regulating the position of a backpressure valve connected to an outlet of the fuel cell stack. The feedforward-based control strategy utilizes a stack pressure setpoint, a stack pressure feedback value, and a feedforward backpressure valve value corresponding to a position of the backpressure valve. The instructions further cause the one or more processors to utilize one or more pressure drop models and a valve position model for the backpressure valve to determine the feedforward backpressure valve value. The instructions additionally cause the one or more processors to utilize the stack pressure feedback value, one or more pressure drop models for a bypass valve, and the valve position model for the bypass valve to regulate the position of the bypass valve to control the flow split or perform a bypass function such as described above in conjunction with the previous embodiment.

In another embodiment, a method of controlling a vehicle fuel cell system is disclosed. The method includes utilizing, by one or more processors, a feedforward-based control strategy to control gas pressure in a fuel cell stack by regulating the position of a backpressure valve connected to an outlet of the fuel cell stack. The feedforward-based control strategy utilizes a stack pressure setpoint, a stack pressure feedback value, and a feedforward backpressure valve value corresponding to a position of the backpressure valve. The method also includes determining the feedforward backpressure valve value using one or more pressure drop models and a valve position model for the backpressure valve. The method further includes generating a bypass valve control command that regulates the position of a bypass valve connected to an inlet of the fuel cell stack and to an outlet of the backpressure valve to control the flow split or bypass extra flow as discussed above. As discussed in more detail below, the bypass valve control command is generated using the stack pressure feedback value, one or more pressure drop models for the bypass valve and the valve position model.

BRIEF DESCRIPTION OF THE DRAWINGS

The following detailed description of specific embodiments can be best understood when read in conjunction with the following drawings, where like structure is indicated with like reference numerals and in which.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION OF THE PREFERRED EMBODIMENTS

According to an aspect of the present invention, a cathode backpressure valve and a cathode bypass valve may be used to regulate the pressure and flow of gas to the fuel cell. A feedforward-based control strategy may be used to control the backpressure valve to regulate the fuel cell stack pressure, while another feedforward-based control strategy may be used to control the bypass valve to regulate the fuel cell stack gas flow. Even though the strategy is feedforward-based, it may also include feedback-based components; such feedback mechanisms, such as proportional-integral (PI) or proportional-integral-derivative (PID) schemes, may be used in conjunction with the feedforward strategies where it is understood an accurate feedforward bias model as a way to predict future component or system behavior is often the fastest, most optimal control, while any residual errors (if present at all) can be taken care of by the PI or PID portion. The better the feedforward portion performs its prediction function, the less PI or PID correction is required. Since no feedforward model performs its function perfectly, the present inventors envision using a PI or PID component to reduce steady state control error. Moreover, since the effects of regulating the bypass valve and the backpressure valve are interrelated, control over the bypass valve may be integrated into (or at least work in conjunction with) the control over the cathode backpressure valve. As such, feedback-based approaches are preferably used in the present invention as a corrective tool rather than as the primary tool, as feedback-based approaches tend to be slow, which can cause oscillations, depending on the gains used.

Figure 1:
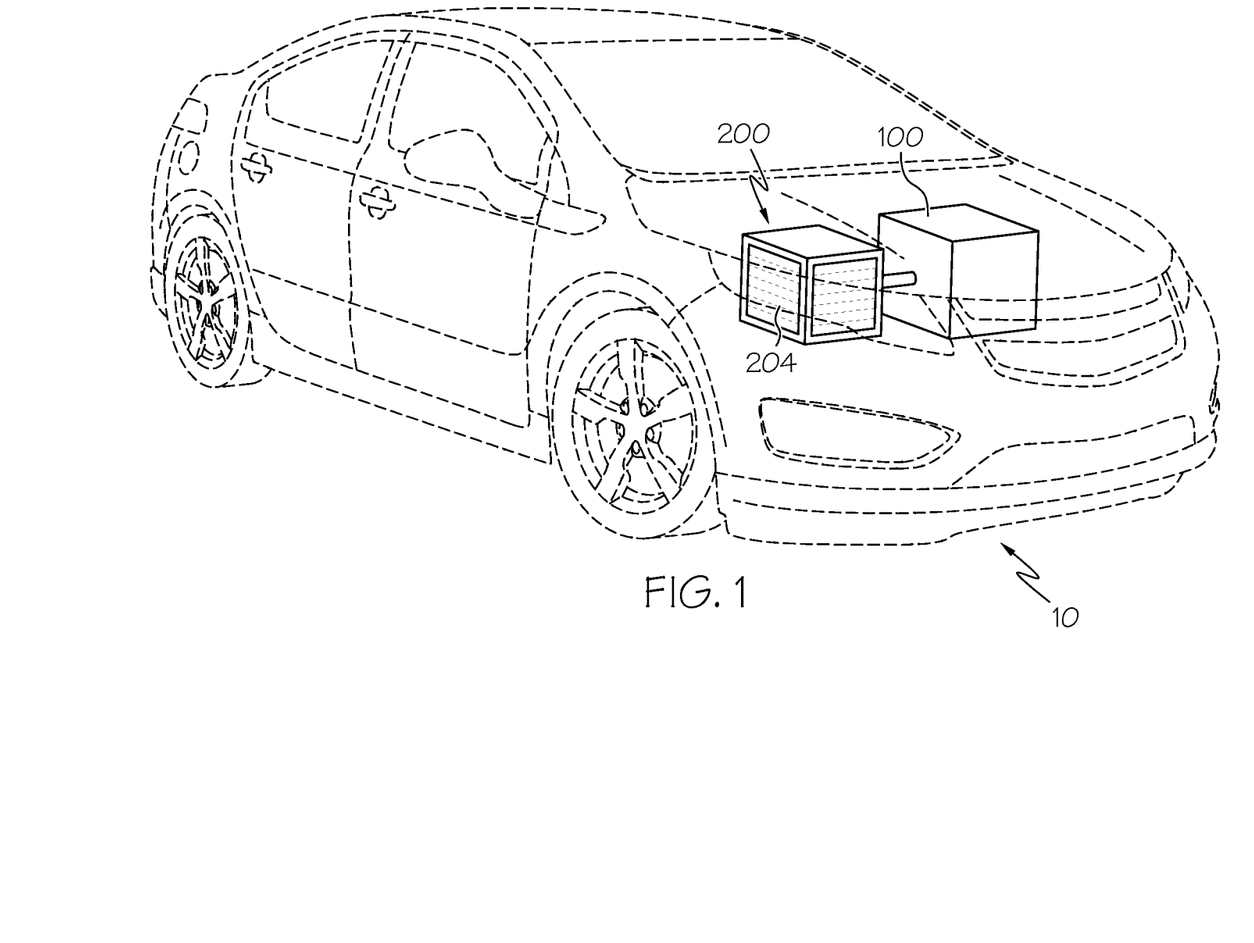
FIG. 1 is a schematic illustration of a vehicle having a fuel cell system.

Referring first to FIG. 1, vehicle 10 is shown, according to embodiments shown and described herein. Vehicle 10 (for example, a car, bus, truck, or motorcycle) includes engine 100, which may be a fully electric or a hybrid electric engine (e.g., an engine that uses both electricity and petroleum-based combustion for propulsion purposes). A fuel cell system 200 that includes at least one stack 204 of individual fuel cells may be used to provide at least a portion of the electric power needs of engine 100. In a preferred form, the fuel cell system 200 is a hydrogen-based one that may include one or more hydrogen storage tanks (not shown), as well as any number of valves, compressors, tubing, temperature regulators, electrical storage devices (e.g., batteries, ultra-capacitors or the like), and controllers that provide control over its operation.

Any number of different types of fuel cells may be used to make up the stack 204 of the fuel cell system 200; these cells may be of the metal hydride, alkaline, electrogalvanic, or other variants. In one preferred (although not necessary) form, the fuel cells are polymer electrolyte membrane (also called proton exchange membrane, in either event, PEM) fuel cells. Stack 204 includes multiple such fuel cells combined in series and/or parallel in order to produce a higher voltage and/or current yield. The produced electrical power may then be supplied directly to engine 100 or stored within an electrical storage device for later use by vehicle 10.

Figure 2:
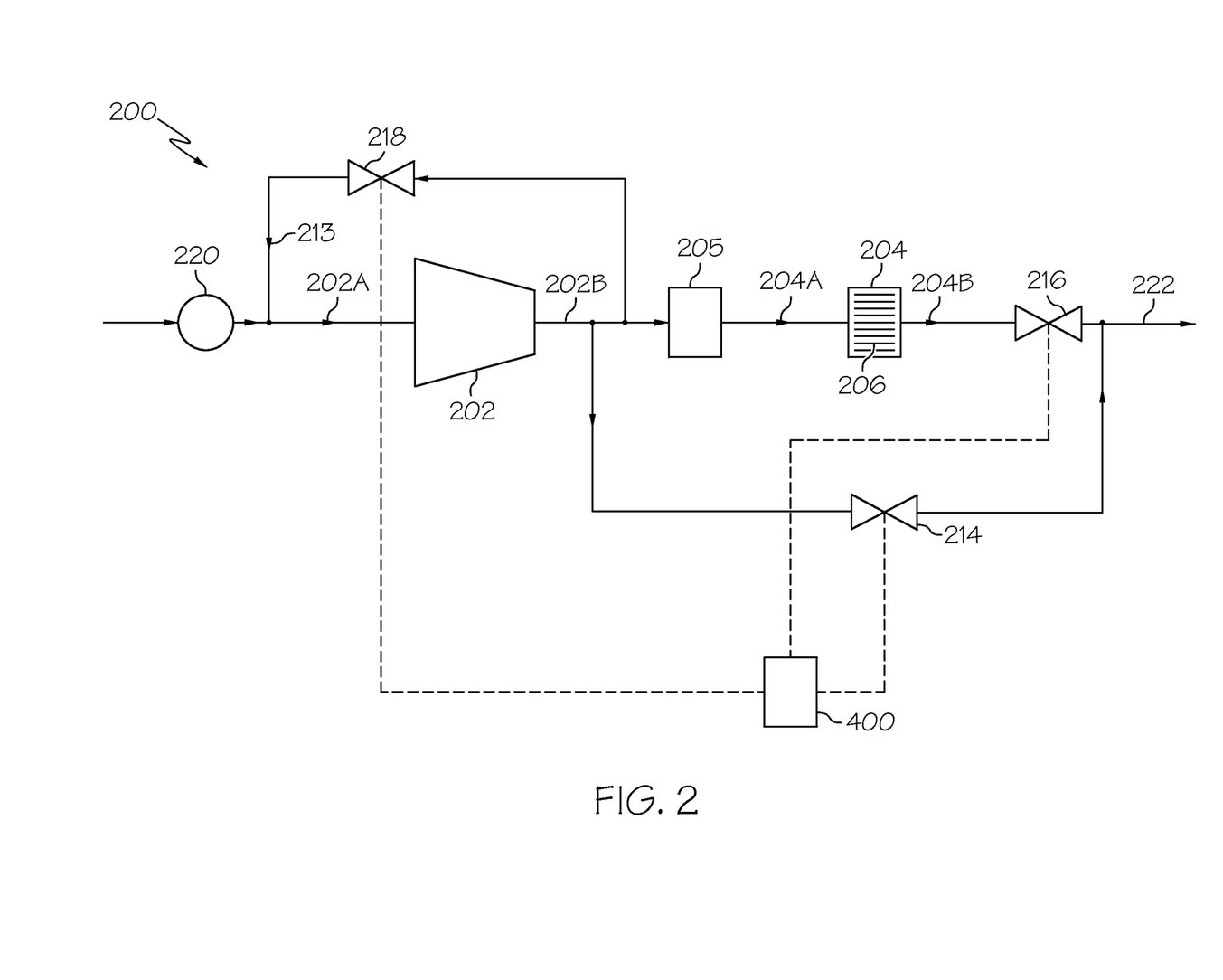
FIG. 2 is a schematic illustration of the air supply system in the vehicle fuel cell system shown in FIG. 1.

Referring next to FIG. 2, a schematic illustration of a portion of fuel cell system 200 that is used to transport one of the reactants (specifically, air) is shown. Compressor 202 receives air at inlet 202A, compresses it, and provides it via outlet 202B to cathode inlet 204A of fuel cell stack 204, where the gas is used as a reactant in the various cells 206 within the stack 204. Exhaust gas and/or liquids are then removed from cathode outlet 204B, which can then pass through cathode backpressure valve 216 (also called an exhaust valve) to be discharged from system 200 through exhaust 222, while additional unreacted gas is removed through the bypass valve 214, which may be used, for example, to dilute the hydrogen left in the cathode of fuel cell stack 204 for catalytic heating as a way to reduce the emissions from the stack 204 during warm-up. In addition, bypass valve 214 may be opened for volt suppression to let compressor 202 sink the load (not shown) of stack 204. As with the exhaust fluids mentioned above, the bypassed gas may be discharged from system 200 via exhaust 222. Preferably, the discharge from bypass valve 214 is connected downstream of the backpressure valve 216 as shown; with such construction, closing the backpressure valve 216 and opening the bypass valve 214 allows nearly all of the flow from compressor 202 to be diverted around the stack 204 in situations where such diversion is desired. In addition to bypass valve 214, fuel cell system 200 may include numerous other valves to help control the flow and pressure of the reactant flowing through stack 204. For example, a recirculation valve 218 that operatively connects outlet 202B and inlet 202A of compressor 202 through a recirculation path or loop 213 as a way to control the flow of gas to fuel cell stack 204 is also shown.

Cathode backpressure valve 216 is used to regulate pressure in the cathode flowpath exhaust from the outlet 204B of fuel cell stack 204. Cathode backpressure valve 216 is configured to cooperate with bypass valve 214 as a way to simultaneously provide flow and pressure regulation of cathode reactant through stack 204. As will be discussed in more detail below, input parameters upon which the cooperation of the backpressure and bypass valves 216, 214 depend may include various temperature, pressure and set point conditions. These and other parameters (such as those associated with enabling or disabling functions of controller 400) may be used to vary the operation of system 200. Furthermore, although much of the control logic described herein is for control over the backpressure valve 216 and bypass valve 214, it will be appreciated by those skilled in the art that additional control logic may be employed to effect control of the compressor 202 and recirculation valve 218 for other functions, such as controlling surge in compressor 202.

Fuel cell system 200 further includes a number of sensors that measure the characteristics of the gas within it. For example, fuel cell system 200 may include flow meter 220 that measures the mass air flow, such as from an air intake. It will be appreciated by those skilled in the art that other sensors (not shown) may be employed in fuel cell system 200 to measure various input parameters such as flows, pressures, temperatures, densities or the like. Further examples of possible sensors in fuel cell system 200 include sensors that measure the valve positions of valves 214, 216, 218 and the speed of compressor 202. Such sensed values may be used by controller 400 as input or a related process disturbance that can be acted upon by the present feedforward-based control strategy. Cathode air cooler (CAC) 205 is a heat exchanger that in most operating modes removes the heat of compression from the incoming air going to stack 204. CAC 205 may also be used in cold ambient conditions to heat up the air entering stack 204 to prevent icing. Although the inlet to bypass valve 214 is shown as being fluidly connected between the outlet of compressor 202 and the inlet CAC 205, it will be appreciated by those skilled in the art that it may also be connected to the stack inlet 204A such that it is downstream of the CAC 205.

It will be appreciated that operation of the fuel cell system 200 in general and the stack 204 in particular is parametric, in that controlling one device often affects other parts of fuel cell system 200. For example, regulating cathode backpressure valve 216 also affects the split of gas flow between fuel cell stack 204 and bypass valve 214. Therefore, the control over one device may be integrated into the control over another device, and the controller 400, as well as the control strategy embodied therein, can be configured to take into consideration these parametric features. In particular, the control over bypass valve 214 is integrated with the control over cathode backpressure valve 216. For example, the feedback pressure for the gas pressure across fuel cell stack 204 may be used for the control of both backpressure valve 216 and bypass valve 214. Doing so allows the desired stack pressure to be met, while still meeting the flow split requirements of fuel cell system 200.

Figure 3:
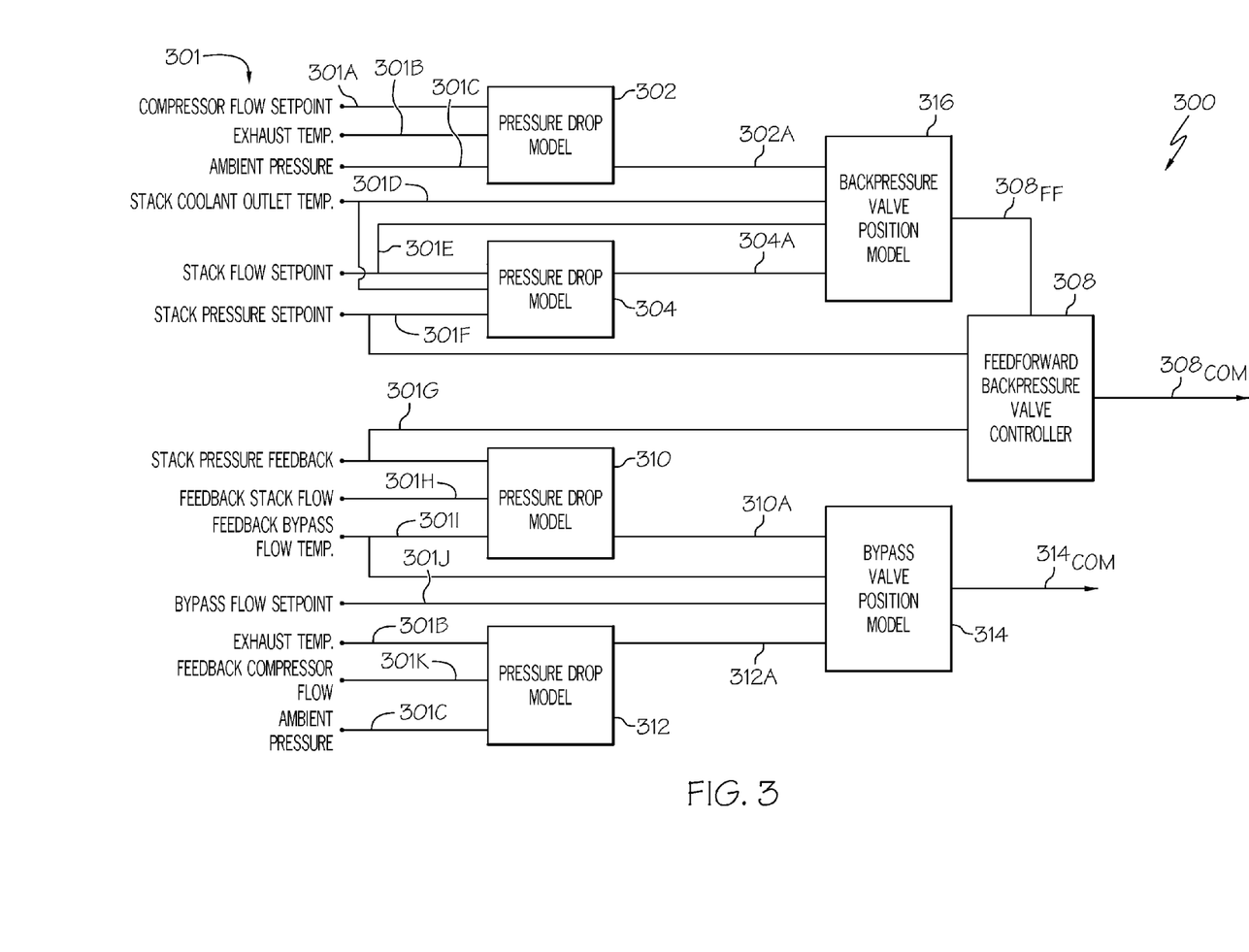
FIG. 3 is an illustration of a portion of a strategy for controlling stack flow and pressure through a cathode backpressure valve and a bypass valve of the vehicle fuel cell system of FIG. 1.

Referring now to FIG. 3, an illustration of a control strategy 300 for cathode backpressure valve 216 and bypass valve 214 is shown. As mentioned above, numerous input parameters 301A through 301K (collectively 301) are used in the control strategy; such input parameters may be introduced either by being sensed (such as through a measuring device) or input (such as through a predetermined setpoint). In one form (as shown predominantly in the upper half of FIG. 3), control strategy 300 uses valve control logic (labeled as "feedforward backpressure valve controller") 308 to deliver a backpressure valve control command $308_{com}$ to govern the position of cathode backpressure valve 216 as a way to achieve a stack cathode inlet pressure setpoint. Backpressure valve control command $308_{com}$ may be any control loop mechanism that incorporates both feedback and feedforward terms. Valve control logic 308 may use both feedforward bias for the bulk of the control and some form of PI or PID as a way to trim any feedforward model error as required. The valve control logic 308 is part of the larger control logic scheme in the controller 400. This additional PI or PID control is depicted by the line 301G (corresponding to the stack pressure feedback) being fed into controller 308. As shown, backpressure valve control command $308_{com}$ uses as input a stack pressure setpoint (also called inlet pressure setpoint) value 301F, a stack pressure feedback (also called a feedback stack cathode inlet pressure) value 301G and a feedforward value $308_{ff}$ determined using additional information about the fuel cell system 200 that is processed by a backpressure valve position model 316. Backpressure valve position model 316 works in concert with the exhaust pressure drop model 302 (which is used for exhaust 222) and the stack pressure drop model 304 (which is used for stack 204) to optimally position the backpressure valve 216 to achieve the desired backpressure setpoint in stack 204.

Referring to FIG. 2 in conjunction with FIG. 3, model 316 is a valve model that receives valve upstream and downstream pressure predictions from pressure drop models 302 and 304, and then uses stack coolant outlet temperature feedback 301D and the stack flow setpoint 301E to calculate the optimum backpressure valve 216 flow area to achieve the desired pressure setpoint. That flow area is then converted into valve opening percentage, which is output to the controller 308 as the feedforward term that provides the control strategy 300 with the ability to quickly and accurately control system 200. Thus, whenever one or both of the stack flow setpoint and the inlet pressure setpoint changes, the backpressure valve 216 is immediately moved to the optimum position instead of having to wait for the PI or PID controller to multiply the pressure error by its gain to eventually move the valve 216 to the correct position.

Pressure drop models 302, 304 are used to predict the pressure at the inlet and outlet of the cathode backpressure valve 216, based on additional information about the fuel cell system 200. More particularly, pressure drop model 302 predicts the pressure 302A at the outlet of the cathode backpressure valve 216 using as input parameters the exhaust temperature 301B and the ambient pressure 301C (where, as mentioned above, such values may be measured by sensors), as well as the compressor flow setpoint 301A (e.g., the total flow provided by the compressor 202 to the fuel cell stack 204 and the bypass valve 214).

Likewise, pressure drop model 304 is used to predict the pressure 304A at the inlet of the cathode backpressure valve 216. In one form of input, a temperature 301D (such as the temperature of the coolant outlet from stack 204, which may be an approximate) may be used. Additional inputs, such as the setpoints for the stack flow 301E and stack pressure 301F setpoints at the fuel cell stack 204, may also be used. The stack coolant outlet temperature 301D and the stack flow setpoint 301E that are used as input to pressure drop model 304 help determine the pressure drop between the inlet 204A of the cathode of stack 204 and the inlet of the cathode backpressure valve 216 (which should—allowing for routine losses—be about the same as outlet 204B of fuel cell stack 204). The predicted inlet pressure of backpressure valve 216 is then determined by subtracting the stack pressure setpoint by the pressure drop from the inlet 204A of the cathode to the inlet of the cathode backpressure valve 216.

Cathode backpressure valve position model 316 utilizes the predicted pressures 304A, 302A at the respective inlet and outlet of the cathode backpressure valve 216, the stack coolant outlet temperature 301D, and the stack flow setpoint 301E to determine the feedforward value $308_{ff}$ used by backpressure valve control command $308_{com}$, where such value correlates to a position of the cathode backpressure valve 216. In some embodiments, the relationship between the feedforward value $308_{ff}$ and the position of cathode backpressure valve 216 can be determined by running a testing routine on the backpressure valve 216. The feedforward value $308_{ff}$ is then used by feedforward backpressure valve control command $308_{com}$ to instruct backpressure valve 216 to change positions.

As mentioned above, since the pressure and flow in the fuel cell stack 204 are interrelated, control strategy 300 also includes control over the bypass valve 214. As shown predominantly in the lower half of FIG. 3, pressure drop models 310, 312 are used to predict the inlet pressure 310A and outlet pressure 312A of the bypass valve 214. Since the backpressure valve control model 308 utilizes stack pressure feedback 301G to control the cathode backpressure valve 216, such feedback pressure value is also used by pressure drop model 310 as part of the control over the bypass valve 214. Pressure drop model 310 predicts the pressure 310A at the inlet of the bypass valve 214 using the stack pressure feedback 301G, the feedback stack flow 301H and the feedback bypass flow temperature 301I. The predicted pressure 310A at the inlet of the bypass valve 214 is the stack pressure feedback 301G plus the pressure drop from the stack cathode inlet to the inlet of the bypass valve 214. Thus, the sensor (not shown) for the stack pressure feedback 301G is located in the stack inlet 204A (of FIG. 2). Pressure drop model 310 can be used to model CAC 205. As mentioned above, the present system may be configured to have bypass valve 214 preferably be fluidly connected either upstream of CAC 205 (as shown), or downstream. In such case, pressure drop model 310 takes the value measured by the sensor corresponding to stack pressure feedback 301G and estimates and then adds the pressure drop attributable to CAC 205 to arrive at the estimated pressure upstream of bypass valve 214. In other words, the predicted pressure 310A at the inlet of the bypass valve 214 is the feedback stack pressure feedback 301G plus the pressure drop from the bypass valve 214 inlet (which is the same as that sensed at compressor outlet 202B) to the stack cathode inlet 204A.

Pressure drop model 312 uses the ambient pressure 301C, exhaust temperature 301B and the feedback flow value 301K for the compressor's total flow to predict the pressure 312A at the outlet of the bypass valve 214. The predicted pressure 312A at the outlet of the bypass valve 214 is calculated as the ambient pressure plus the pressure drop from the outlet of the bypass valve to the outlet of the exhaust 222. The exhaust temperature may be determined using an enthalpy mixing model based on the bypass flow, temperature of the bypass flow, stack flow and the temperature of the stack flow.

Bypass valve position model 314 utilizes the predicted bypass valve inlet pressure 310A, the predicted bypass valve outlet pressure 312A, the bypass flow setpoint 301J and the feedback bypass flow temperature 301I to determine a bypass valve control command $314_{com}$ that causes the bypass valve 214 to change positions. In this way, the control over both the cathode backpressure valve 216 and the bypass valve 214 are coupled. Oscillation due to the coupling is also mitigated by the use of the feedforward value as part of the control over the backpressure valve 216. As such, use of a backpressure valve 216 and a flow split control between the flowpath of stack 204 and the bypass valve 214 can be used as part of a larger pressure control logic.

Figure 4:
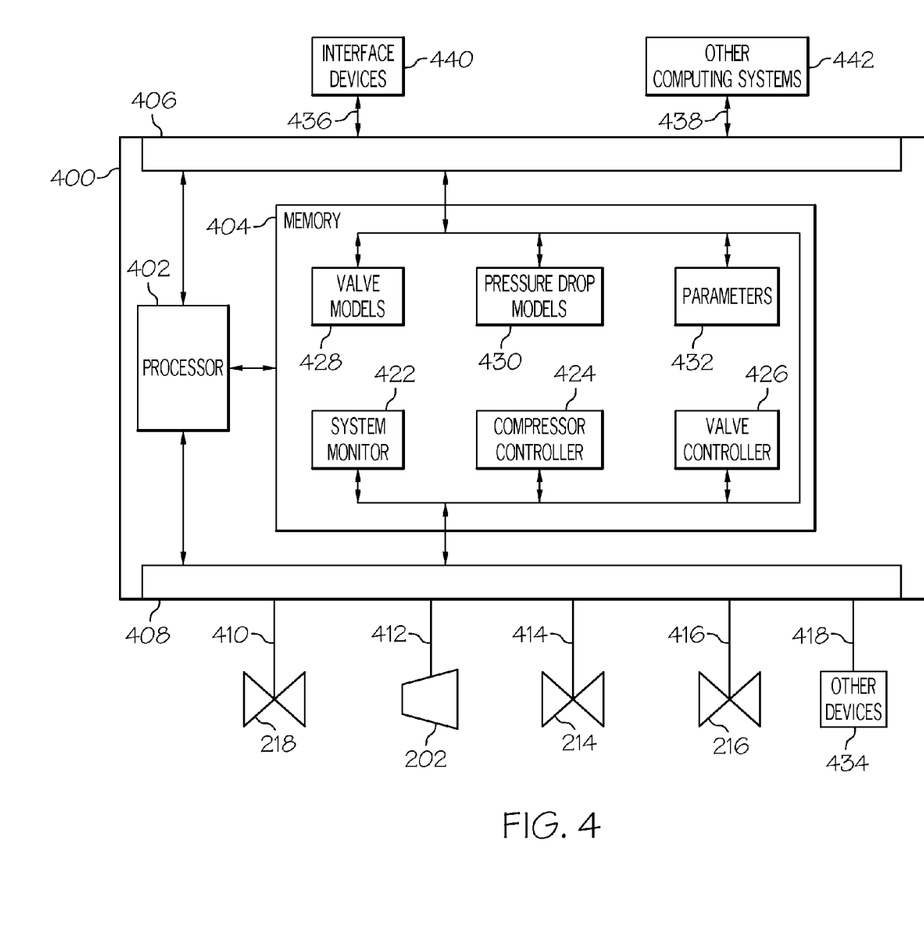
FIG. 4 is a schematic illustration of a controller for the vehicle fuel cell system of FIG. 1.

Referring now to FIG. 4 in conjunction with FIG. 2, a controller 400 for a vehicle fuel cell system 200 is shown, according to embodiments shown and described herein. Controller 400 includes processor 402, which may be one or more of a microprocessor, an application specific integrated circuit (ASIC), field programmable gate array or the like. Processor 402 is communicatively coupled to memory 404 and interfaces 406 and 408. Memory 404 may be any form capable of storing machine-executable instructions that implement one or more of the functions disclosed herein, when executed by processor 402. For example, memory 404 may be a RAM, ROM, flash memory, hard drive, EEPROM, CD-ROM, DVD other forms of non-transitory memory devices, or any combination of different memory devices. In a preferred form, at least a portion of controller 400 is configured to function as a feedforward-based device, in that the operation of one or both of the flow-controlling bypass valve 214 and backpressure valve 216 is based on mathematical models or related characterization of the fuel cell system 200, where program elements corresponding to such models can be loaded into the controller's memory 404. In this way, by combining the mathematical model of the operation of parts or all of the fuel cell system 200 into the algorithm in controller 400, appropriate control actions may be taken by the controller 400 based on known system parameters (such as those being sensed, measured or otherwise fed into the algorithm). As stated above, optimization of the operation of fuel cell system 200 may be enhanced by combining feedforward elements with some feedback-based elements, as the feedforward control is preferred for quickness in transitions, while the feedback is needed to reduce minor steady state errors in the feedforward model.

The stack pressure setpoint 301F (as shown in FIG. 3) of the cathode portion of stack 204 is achieved by controlling the cathode backpressure valve 216 based on one or more pressure sensor readings. As mentioned above, in one form, controller 400 may include PI or PID feedback mechanisms, as well as a feedforward portion that is calculated through one or more valve models 314, 316 and multiple pressure drop models 302, 304, 310, 312 that are in turn based on the requested airflow through the stack 204. The feedforward term, in conjunction with the PI or PID control of the cathode backpressure valve 216, will enhance stability by reducing oscillations within system 200. Similar control over bypass valve 214 is achieved based on feedback of valve 214 inlet and outlet pressures, a feedback value corresponding to bypass flow temperature, as well as requested bypass flow. The correlation of control over valves 214, 216 reflects the tight coupling of the stack's cathode subsystem and the need for regulating the backpressure valve 216 for pressure control along with regulating the bypass valve 214 for flow control. As such, a mathematical algorithm (which can be embodied in memory 404 to be operated upon by processor 402) can control the pressure and flow of stack 204 as a way to meet the setpoints when the cathode bypass valve 214 is commanded to be open. Such accurate control the stack 204 flow and pressure is necessary to compensate for the inability of the system 200 to obtain a direct indication of the stack flow, as the cathode mass flow meter 220, which is in front of the compressor 202, will only register the total of the flow through both the bypass that passes through valve 214 and the stack 204.

Controller 400 communicates with various devices in fuel cell system 200 and may also provide control over the devices 434 (such as sensors, meters, other valves or related equipment). In particular, controller 400 receives, either directly or indirectly, sensor measurements from fuel cell system 200 to monitor system 200 operation. For example, controller 400 may receive temperature, pressure, flow, density, valve position, speed, or other measurements from sensors associated with one or more of compressor 202, bypass valve 214, recirculation valve 218 and cathode backpressure valve 216. It should be appreciated that any number of different combinations of sensors and sensor configurations may be used, without deviating from the principles or teachings of the present disclosure.

Connections 410, 412, 414, 416, and 418 may be any combination of hardwired or wireless connections that provide signal communication between controller 400 and one or more of recirculation valve 218, compressor 202, bypass valve 214, cathode backpressure valve 216 and other devices 434. For example, connection 410 may be a hardwired connection, while connection 412 may be a wireless connection. In some embodiments, connections 410, 412, 414, 416, and 418 are part of a shared data line that conveys measurement data to controller 400 and control commands to the devices of fuel cell system 200. In yet other embodiments, connections 410, 412, 414, 416 and 418 may include one or more intermediary circuits (e.g., other microcontrollers, signal filters, etc.) and provide an indirect connection between controller 400, compressor 202, bypass valve 214, recirculation valve 218, cathode backpressure valve 216 and other devices 434.

Interface 408 is configured to receive measurement data and to transmit control commands to recirculation valve 218, compressor 202, bypass valve 214, cathode backpressure valve 216 and other devices 434. For example, interface 408 may include one or more wireless transceivers, if any of connections 410, 412, 414, 416 and 418 are wireless connections. Interface 408 may also include one or more wired ports, if any of connections 410, 412, 414, 416 and 418 are wired connections. Interface 408 may also include circuitry configured to digitally sample or filter received measurement data. For example, interface 408 may sample temperature data received from a temperature sensor of compressor 202 via connection 412 at discrete times (e.g., k, k+1, k+2, etc.) to produce discrete temperature values (e.g., T(k), T(k+1), T(k+2), etc.).

In some embodiments, controller 400 may also communicate with interface devices 440 (e.g., a data input, display, speaker, printer or any other electronic device that provides and/or receives data to and from a user) via connection 436. Controller 400 may further communicate with other computing systems 442 (e.g., another controller, a portable electronic device, a server or the like) via connection 438. Connections 436 and 438 may be wired and/or wireless connections. For example, other computing systems 442 may include a server located remotely from vehicle 100 and connection 438 may be a wireless connection. For example, controller 400 may communicate status condition information to the server in other computing systems 442 via a cellular, WiFi, radio, satellite connection, or the like. Interface 406 may also include one or more transceivers configured to send and receive location information for vehicle 100. For example, interface 406 may include a GPS receiver or cellular receiver that utilizes triangulation to determine the location of vehicle 100. In other embodiments, interfaces 406 and 408 may be a single interface for controller 400.

Memory 404 is shown to include system monitor 422 that receives sensor measurements from sensors associated with fuel cell system 200 (e.g., recirculation valve 218, bypass valve 214, cathode backpressure valve 216, compressor 202, and other devices 434). Sensor measurement may include, for example, measurements of temperature, pressure, or gas flow. According to some embodiments, system monitor 422 may receive the gas flow measurement from flow meter 220 (e.g., which may be part of other devices 434), the pressure and temperature at inlet 210 of compressor 202, the pressure and temperature at outlet 212 of compressor 202, and/or the gas flow through compressor 202. System monitor 422 may also receive measurements of one or more of the pressure, temperature, and gas flow into or out of fuel cell stack 204, cathode backpressure valve 216, recirculation valve 218, bypass valve 214 and exhaust 222.

In some embodiments, memory 404 also includes compressor controller (more particularly, a compressor control logic in a manner generally analogous to the valve control logic that was labeled as feedforward backpressure valve controller 308 discussed above) 424 that receives measurement data from system monitor 422 and uses the measurement data to provide control over compressor 202. For example, compressor controller 424 may utilize a feedback loop based on the total gas flow needed by fuel cell stack 204 and bypass valve 214. In such a case, compressor controller 424 may generate a compressor control command that causes compressor 202 to change its operating state, such as its speed. Compressor controller 424 may additionally or alternatively provide data to valve controller 426, which controls the position of recirculation valve 218. In some cases, compressor controller 424 may utilize a compressor map (not shown) that relates the differential pressure (e.g., the difference between pressures at inlet 210 and outlet 212 of compressor 202), the gas flow through compressor 202 and the speed of compressor 202. Such a map may be utilized by compressor controller 424 to avoid and/or mitigate surge conditions.

Memory 404 may also include valve controller 426, which provides control over one or more of the recirculation valve 218, cathode backpressure valve 216 and bypass valve 214. Valve controller 426 may receive measurement data from one or more of the system monitor 422 and compressor controller 424; it may include one or more control loops to generate valve control commands that regulate the valves of fuel cell system 200. For example, valve controller 426 may utilize a feedforward-based control loop to control cathode backpressure valve 216.

Valve controller 426 may also utilize pressure drop models 430 as part of its control over the valves of fuel cell system 200. In cases where pressure sensors are impractical or not used at a specific point in fuel cell system 200 (such as at the inlet or outlet of the backpressure valve 216, for example), pressure drop models 430 may be used to predict the pressure at that point. Pressure drop models 430 may utilize measurement data from system monitor 422 as part of the prediction. In some cases, pressure drop models 430 may also utilize setpoint or feedback data from compressor controller 424 or valve controller 426 as part of the pressure prediction. In one embodiment, pressure drop models 428 may be used to predict the inlet and outlet pressure of cathode backpressure valve 216 and bypass valve 214. For example, ambient pressure and exhaust temperatures from system monitor 422, as well as the feedback compressor flow from compressor controller 424, may be used by pressure drop models 430 to determine a predicted pressure at the outlet of bypass valve 214.

In some embodiments, valve controller 426 may use the predicted pressures from pressure drop models 430 with valve models 428 to determine a feedforward value for the control loop used to control cathode backpressure valve 216. For example, the control loop may utilize a stack cathode inlet pressure feedback value to control cathode backpressure valve 216 to approach a stack cathode inlet pressure setpoint. Valve controller 426 may also utilize the feedforward value from valve models 428 to generate a valve control command that causes cathode backpressure valve 216 to change positions.

Valve controller 426 may also integrate the control of bypass valve 214 into the control over cathode backpressure valve 216, according to some embodiments. Since the stack pressure and flow split between the stack and bypass valve 214 are interrelated, valve controller 426 may incorporate the feedback stack cathode inlet pressure and feedback of the stack flow into the control over bypass valve 214. Valve controller 426 uses measurement data from system monitor 422 (e.g., the ambient pressure, various temperatures or the like), the feedback compressor flow value from compressor controller 424, the feedback stack cathode inlet pressure from the control over cathode backpressure valve 216, the feedback stack flow, and a feedback bypass flow temperature with pressure drop models 430, to predict the pressure at the inlet and outlet of bypass valve 214. Valve controller 426 then uses the predicted inlet and outlet pressures, a bypass flow setpoint, and a feedback bypass flow temperature from system monitor 422 with valve models 428 to generate a bypass valve control command. The present inventors have conducted experiments to determine flow and pressure control. Results from these experiments showed that under the present invention, stack flow meets the flow setpoint, stack pressure meets the pressure setpoint and bypass flow meets the bypass flow setpoint.

Parameters 432 include any values that alter the functions of controller 400. For example, parameters 432 may include one or more threshold values for the speed of compressor 202, temperature thresholds, and a surge condition time limit. Parameters 432 may also include values that enable or disable functions of controller 400. For example, parameters 432 may include a parameter that determines if valve controller 426 integrates the control of bypass valve 214 and cathode backpressure valve 216 or utilizes a different control strategy. Parameters 432 may further include values that determine how information about fuel cell system 200 is conveyed to interface devices 440 or to other computing systems 442 (e.g., how often, what format, and the like).

In some cases, some or all of parameters 432 may be pre-loaded into memory 404 (e.g., by the manufacturer of controller 400, the manufacturer of vehicle 100 or the like). In other cases, some or all of parameters 432 may be provided to controller 400 via interface devices 440 or other computing systems 442. Further, some or all of parameters 432 may be updated or deleted via interface devices 440 and/or other computing systems 442. As indicated above in conjunction with FIG. 3, additional input parameters 301 may be used.

Although controller 400 is shown in FIG. 4 as a singular device, it is to be understood that this is merely exemplary and is not intended to be limiting. For example, processor 402 may include any number of processors of any number of computing devices that execute the instructions stored in memory 404. Likewise, memory 404 may include any number of memory devices and is not limited to memory devices located within the same housing as processor 402. In some cases, at least one of the processor 402 and memory 404 may even be located external to vehicle 100.

Many modifications and variations of embodiments of the present invention are possible in light of the above description. The above-described embodiments of the various systems and methods may be used alone or in any combination thereof without departing from the scope of the invention. Although the description and figures may show a specific ordering of steps, it is to be understood that different orderings of the steps are also contemplated in the present disclosure. Likewise, one or more steps may be performed concurrently or partially concurrently.

What is claimed is:

1. A vehicle fuel cell system comprising:
 a fuel cell stack defining at least one anode flowpath and at least one cathode flowpath therein;
 a backpressure valve fluidly connected to an outlet of said at least one cathode flowpath;
 a bypass valve configured to provide selective fluid bypass around said at least one cathode flowpath; and
 a controller configured regulate a flow and a pressure of a fuel cell stack through the simultaneous control of both said backpressure valve and said bypass valve, said controller comprising at least one processor and a non-transitory memory such that instructions stored in said memory are executed by said at least one processor to control positions of said backpressure valve and said bypass valve to simultaneously satisfy a backpressure setpoint and a flow setpoint through utilization of:
  a feedforward-based control strategy to control gas pressure in said fuel cell stack by regulating the position of said backpressure valve, wherein said feedforward-based control strategy utilizes a stack pressure setpoint, a stack pressure feedback value and a feedforward backpressure valve value corresponding to a position of said backpressure valve;
  at least one pressure drop model and a valve position model for said backpressure valve to determine said feedforward backpressure valve value; and
  a valve position model for said bypass valve using said stack pressure feedback value, at least one pressure drop model for said bypass valve, a bypass flow setpoint, and a feedback bypass flow temperature value to regulate the position of said bypass valve.

2. The system of claim 1, further comprising a compressor with an outlet thereof fluidly connected to said inlet of said fuel cell stack such that said instructions further cause control over said compressor.

3. The system of claim 2, wherein said compressor is controlled by utilizing feedback from gas flow through the compressor to approach a compressor flow setpoint.

4. The system of claim 3, wherein said compressor flow setpoint is used with said at least one pressure drop model for said backpressure valve to determine said feedforward backpressure valve value.

5. The system of claim 4, wherein said feedback from the gas flow through the compressor is used with said pressure drop model for said bypass valve to regulate the position of said bypass valve.

6. The system of claim 1, wherein said feedforward-based control strategy further comprises a feedback component based on a proportional-integral control strategy.

7. The system of claim 1, wherein said at least one pressure drop model for said backpressure valve is used to predict pressure at said inlet and said outlet of said backpressure valve.

8. The system of claim 1, wherein said at least one pressure drop model for said bypass valve is used to predict pressure at said inlet and said outlet of said bypass valve.

9. A fuel cell system controller coupled to a cathode flowpath backpressure valve and a cathode flowpath bypass valve configured to simultaneously satisfy a stack flow setpoint and a stack pressure setpoint of a cathode flowpath in a fuel cell systemthe controller comprising:
 at least one processor; and a non-transitory memory cooperative with said at least one processor to store instructions that when executed by said at least one processor cause said at least one processor to:
calculate a feedforward backpressure valve value utilizing at least one pressure drop model and a backpressure valve position model,
calculate a backpressure valve control command using said feedforward backpressure valve value, said stack pressure setpoint, and a stack pressure feedback value,
calculate a bypass valve control command from a bypass valve position model using at least one pressure drop model, a bypass flow setpoint, and a feedback bypass flow temperature wherein said at least one pressure drop model includes said stack pressure feedback value,
regulate a position of said backpressure valve using said backpressure valve control command to meet said stack pressure setpoint, and
regulate a position of said by-pass valve using said bypass valve control command to meet said stack flow setpoint simultaneously with the regulation of the position of said backpressure valve.

10. The controller of claim 9, wherein instructions further cause said at least one processor to control a compressor fluidly connected to said fuel cell stack and said bypass valve.

11. The controller of claim 10, wherein said compressor is controlled by utilizing feedback from gas flow through said compressor to approach a compressor flow setpoint.

12. The controller of claim 11, wherein said compressor flow setpoint is used with said backpressure valve pressure drop model to determine said feedforward backpressure valve value.

13. The controller of claim 12, wherein feedback from the gas flow through said compressor is used with said bypass valve pressure drop model to regulate the position of said bypass valve.

14. The controller of claim 9, wherein said feedforward-based control strategy comprises a feedforward-based proportional-integral control strategy.

15. The controller of claim 9, wherein said at least one pressure drop model is used to predict inlet pressure and outlet pressure of said backpressure valve.

16. The controller of claim 9, wherein said at least one bypass valve pressure drop model is used to predict inlet pressure and outlet pressure of said bypass valve.

17. A method of controlling a cathode flowpath of a vehicular fuel cell system by simultaneously satisfying a stack flow setpoint and a stack pressure setpoint of said cathode flowpath that includes both a cathode flowpath backpressure valve and a cathode flowpath bypass valve such that said backpressure valve is commanded to meet said stack pressure setpoint while said bypass valve is commanded to meet said stack flow setpoint, said method comprising:
utilizing, by at least one processor, a feedforward-based control strategy to control gas pressure in a fuel cell stack by regulating a position of said backpressure valve connected to an outlet of said fuel cell stack, wherein said feedforward-based control strategy utilizes a stack pressure setpoint, a stack pressure feedback value and a feedforward backpressure valve value corresponding to a position of said backpressure valve;
determining said feedforward backpressure valve value using at least one pressure drop model and a valve position model for said backpressure valve; and
generating a bypass valve control command that simultaneously regulates a position of said bypass valve to control a flow split between a flowpath in said stack with said position of said backpressure valve and said bypass valve, wherein said bypass valve control command is generated from a valve position model for the bypass valve using said stack pressure feedback value, said at least one pressure drop model for said bypass valve, a bypass flow setpoint, and a feedback bypass flow temperature value.

18. The method of claim 17, further comprising controlling a compressor fluidly connected to said fuel cell stack and to said bypass valve by utilizing feedback from gas flow through said compressor to approach a compressor flow setpoint.

19. The method of claim 18, wherein said compressor flow setpoint is used with said pressure drop model for said backpressure valve to determine said feedforward backpressure valve value, and wherein the feedback from gas flow through said compressor is used with said pressure drop model for said bypass valve to regulate a position of said bypass valve.

20. The method of claim 17, wherein said at least one bypass valve pressure drop model is used to predict pressure at an inlet and outlet of said bypass valve, and wherein said at least one backpressure valve pressure drop model is used to predict pressure at an inlet and outlet of said backpressure valve.

* * * * *